United States Patent
Wu et al.

(10) Patent No.: US 12,430,347 B2
(45) Date of Patent: Sep. 30, 2025

(54) SPARSE COLUMN-AWARE ENCODINGS FOR NUMERIC DATA TYPES

(71) Applicant: Intel Corporation, Santa Clara, CA (US)

(72) Inventors: Wei Wu, Portland, OR (US); Sourabh Dongaonkar, Portland, OR (US); Jawad B. Khan, Portland, OR (US)

(*) Notice: Subject to any disclaimer, the term of this patent is extended or adjusted under 35 U.S.C. 154(b) by 872 days.

(21) Appl. No.: 17/341,963

(22) Filed: Jun. 8, 2021

(65) Prior Publication Data

US 2021/0294799 A1   Sep. 23, 2021

(51) Int. Cl.
G06F 16/2458  (2019.01)
G06F 16/22    (2019.01)
G06F 16/248   (2019.01)
G06N 3/047    (2023.01)

(52) U.S. Cl.
CPC ...... *G06F 16/2462* (2019.01); *G06F 16/2237* (2019.01); *G06F 16/2282* (2019.01); *G06F 16/248* (2019.01); *G06N 3/047* (2023.01)

(58) Field of Classification Search
CPC ............ G06F 16/2237; G06F 16/2458; G06F 16/2462; G06F 16/2282; G06F 16/90339
See application file for complete search history.

(56) References Cited

U.S. PATENT DOCUMENTS

| | | | |
|---|---|---|---|
| 5,649,181 A * | 7/1997 | French | G06F 16/2237 |
| 6,141,176 A * | 10/2000 | Blaum | G11B 5/012 |
| 10,224,954 B1 * | 3/2019 | Madduri | H03M 7/24 |
| 11,360,769 B1 * | 6/2022 | Schwarz | G06F 9/3001 |
| 2007/0053378 A1 * | 3/2007 | Kuekes | G11C 13/0069 370/464 |
| 2016/0378805 A1 * | 12/2016 | Hopcroft | G06F 16/2272 707/715 |
| 2019/0102391 A1 * | 4/2019 | Mishra | G06F 16/24552 |
| 2019/0220735 A1 * | 7/2019 | Sengupta | G06N 3/047 |
| 2020/0266929 A1 * | 8/2020 | Wu | H04L 1/0643 |
| 2022/0276867 A1 * | 9/2022 | Schwarz | G06F 9/30036 |

* cited by examiner

*Primary Examiner* — James E Richardson
(74) *Attorney, Agent, or Firm* — Haley Guiliano LLP

(57) ABSTRACT

Methods and apparatus for sparse column-aware encodings for numeric data types, including integer data and floating-point data (float, double, etc.). The encoding schemes are tailored to take advantage of column addressable memories such as stochastic associative memories (SAM) to enable Stochastic Associative Search (SAS), which is a highly efficient and fast way of searching through a very large database of records (order of Billions) and finding similar records to a given query record (search key). Techniques are also disclosed for performing range searches for both integer and floating-point data types. The integer or float data is converted to Hexadecimal form and encoded using an m-of-n constant weight encoding. Only the columns with set bits in search keys need to be read, which significantly reduces the number of reads required for searches.

22 Claims, 14 Drawing Sheets

| HEX | Encoding | | | | | | |
|-----|---|---|---|---|---|---|---|
| 0 | 1 | 1 | 0 | 0 | 0 | 0 | 0 |
| 1 | 1 | 0 | 1 | 0 | 0 | 0 | 0 |
| 2 | 1 | 0 | 0 | 1 | 0 | 0 | 0 |
| 3 | 1 | 0 | 0 | 0 | 1 | 0 | 0 |
| 4 | 1 | 0 | 0 | 0 | 0 | 1 | 0 |
| 5 | 1 | 0 | 0 | 0 | 0 | 0 | 1 |
| 6 | 0 | 1 | 1 | 0 | 0 | 0 | 0 |
| 7 | 0 | 1 | 0 | 1 | 0 | 0 | 0 |
| 8 | 0 | 1 | 0 | 0 | 1 | 0 | 0 |
| 9 | 0 | 1 | 0 | 0 | 0 | 1 | 0 |
| A | 0 | 1 | 0 | 0 | 0 | 0 | 1 |
| B | 0 | 0 | 1 | 1 | 0 | 0 | 0 |
| C | 0 | 0 | 1 | 0 | 1 | 0 | 0 |
| D | 0 | 0 | 1 | 0 | 0 | 1 | 0 |
| E | 0 | 0 | 1 | 0 | 0 | 0 | 1 |
| F | 0 | 0 | 0 | 1 | 1 | 0 | 0 |

*Fig. 5a*

| HEX | Encoding | | | | | | |
|-----|---|---|---|---|---|---|---|
| 0 | 1 | 1 | 1 | 0 | 0 | 0 | 0 |
| 1 | 1 | 1 | 0 | 1 | 0 | 0 | 0 |
| 2 | 1 | 1 | 0 | 0 | 1 | 0 | 0 |
| 3 | 1 | 1 | 0 | 0 | 0 | 1 | 0 |
| 4 | 1 | 0 | 1 | 1 | 0 | 0 | 0 |
| 5 | 1 | 0 | 1 | 0 | 1 | 0 | 1 |
| 6 | 1 | 0 | 1 | 0 | 0 | 1 | 0 |
| 7 | 1 | 0 | 0 | 1 | 1 | 0 | 0 |
| 8 | 1 | 0 | 0 | 0 | 1 | 1 | 0 |
| 9 | 1 | 0 | 0 | 0 | 1 | 1 | 0 |
| A | 0 | 1 | 1 | 1 | 0 | 0 | 1 |
| B | 0 | 1 | 1 | 0 | 1 | 0 | 0 |
| C | 0 | 1 | 1 | 0 | 0 | 1 | 0 |
| D | 0 | 1 | 0 | 1 | 1 | 0 | 0 |
| E | 0 | 1 | 0 | 1 | 0 | 1 | 1 |
| F | 0 | 1 | 1 | 0 | 0 | 1 | 1 |

$$6.63 \times 10^{-34}$$
$$\underbrace{\phantom{6.63}}_{Mantissa} \phantom{\times} \underbrace{\phantom{10^{-34}}}_{Exponent}$$

(FP32 and FP64 hex encoding tables)

FP32: $\underbrace{\text{6 Hex (24-bits)}}_{Mantissa} \times \underbrace{\text{2 Hex (8-bits)}}_{Exponent}$ FP64: $\underbrace{\text{13 Hex (62-bits)}}_{Mantissa} \times \underbrace{\text{3 Hex (12-bits)}}_{Exponent}$

SPARSE COLUMN-AWARE ENCODINGS FOR NUMERIC DATA TYPES

BACKGROUND INFORMATION

The encoding of data symbols (e.g., symbols that alone or in combination define a set of data, such as letters, numbers, etc.) is typically measured in terms of the code length and the bit weight used to encode the data symbols. The code length, L, defines the number of bits for each data symbol. The larger the code length, the more storage overhead is required to store a set of data symbols in memory. The bit weight, W, defines the number of bits that are set (e.g., to one) within the code length to define a given data symbol. Typical data symbol encoding schemes are established based on the assumption that the encoded data will be accessed in rows, as typical memory architectures enable specific rows of data to be accessed (e.g., read), but not specific columns (e.g., individual bits).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5a is a table illustrating an example of 2-of-7 constant weight encoding for Hex values 0-F;

FIG. 5b is a table illustrating an example of 3-of-7 constant weight encoding for Hex values 0-F;

FIG. 7 shows an example of a floating-point encoding for Planck's constant;

FIG. 8 is a diagram illustrating an encoding scheme for a 32-bit floating point number using 2-of-7 constant weight encoding, according to one embodiment;

DETAILED DESCRIPTION

Figure 1:
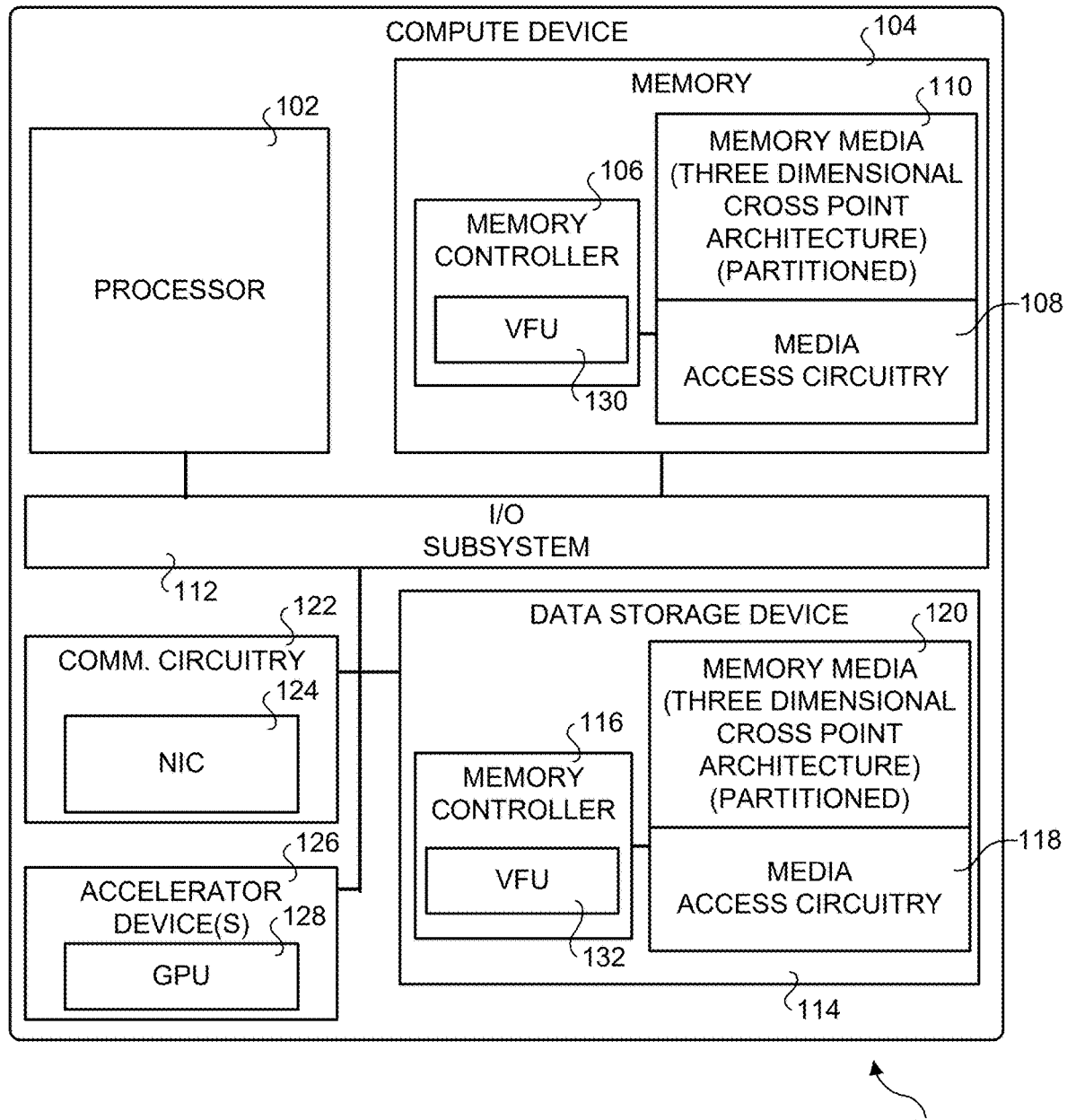
FIG. 1 is a simplified diagram of at least one embodiment of a compute device for performing similarity search acceleration using column-read enabled memory.

Embodiments of methods and apparatus for sparse column-aware encodings for numeric data types are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

An accordance with aspects of the embodiments disclosed herein, techniques are provided for sparse column-aware encodings for numeric data types including integer data and floating-point data (float, double, etc.). The encoding schemes are tailored to take advantage of column addressable memories such as stochastic associative memories (SAM) to enable Stochastic Associative Search (SAS), which is a highly efficient and fast way of searching through a very large database of records (order of Billions) and finding similar records to a given query record (search key). The embodiments also disclose technique for performing range searches for both integer and floating-point data types.

FIG. 1 shows an exemplary compute device 100 for performing sparse column-aware encodings for numeric data types in accordance with embodiments disclosed herein. Compute device 100 includes a processor 102, a memory 104, an input/output (I/O) subsystem 112, a data storage device 114, communication circuitry 122, and one or more optional accelerator devices 126. Memory 104 includes a memory controller 106 coupled to media access circuitry 108 used to access memory media 110. Data storage device 114 includes a memory controller 116 coupled to media access circuitry 118 used to access memory media 120. Generally, media access circuitry 108 and 118 comprises circuitry or a device configured to access and operate on data in the corresponding memory media 110 and 120, respectively.

In addition to the selected components shown, compute device 100 may include other or additional components, such as those commonly used by computers (e.g., a display, peripheral devices, etc.). In some embodiments, one or more of the illustrative components may be incorporated in, or otherwise form a portion of, another component.

Generally, the term "memory," as used herein, may refer to the memory in a memory device, such as memory 104, and/or may refer to memory in data storage devices, such as data storage device 114, unless otherwise specified. As explained in further detail below, media access circuitry 108, 118 connected to a corresponding memory media 110, 120 (e.g., any device or material that data is written to and read from) may access (e.g., read) individual columns (e.g., bits) of vectors for use with connection to the variable sparse encoding techniques disclosed herein.

Memory media 110, in the illustrative embodiment, has a three-dimensional cross-point architecture that has data access characteristics that differ from other memory architectures (e.g., dynamic random access memory (DRAM)), such as enabling access to one bit per tile and incurring latencies between reads or writes to the same partition or other partitions. Media access circuitry 108 is configured to make efficient use (e.g., in terms of power usage and speed) of the architecture of the memory media 110, such as by accessing multiple tiles in parallel within a given partition. In some embodiments, the media access circuitry 108 may utilize scratch pads (e.g., relatively small, low latency memory) to temporarily retain and operate on data read from the memory media 110 and broadcast data read from one partition to other portions of the memory 104 to enable calculations (e.g., matrix operations) to be performed in parallel within the memory 104. Additionally, in the illustrative embodiment, instead of sending read or write requests to the memory 104 to access matrix data, the processor 102 may send a higher-level request (e.g., a request for a macro operation, such as a request to return a set of N search results based on a search key). As such, many compute operations, such as artificial intelligence operations can be performed in memory (e.g., in the memory 104 or in the data storage device 114), with minimal usage of the bus (e.g., the I/O subsystem 112) to transfer data between components of the compute device 100 (e.g., between the memory 104 or data storage device 114 and the processor 102).

In some embodiments media access circuitry 108 is included in the same die as memory media 110. In other embodiments, media access circuitry 108 is on a separate die but in the same package as memory media 110. In yet other embodiments, media access circuitry 108 is in a separate die and separate package but on the same dual in-line memory module (DIMM) or board as memory media 110.

Processor 102 may be embodied as any device or circuitry (e.g., a multi-core processor(s), a microcontroller, or other processor or processing/controlling circuit) capable of performing operations described herein, such as executing an application. In some embodiments, processor 102 may be embodied as, include, or be coupled to a field-programmable gate array (FPGA), an application specific integrated circuit (ASIC), reconfigurable hardware or hardware circuitry, or other specialized hardware to facilitate performance of the functions described herein.

Memory 104, which may include a non-volatile memory in some embodiments (e.g., a far memory in a two-level memory scheme), includes memory media 110 and media access circuitry 108 (e.g., a device or circuitry, such as a processor, application specific integrated circuitry (ASIC), or other integrated circuitry constructed from complementary metal-oxide-semiconductors (CMOS) or other materials) underneath (e.g., at a lower location) and coupled to the memory media 110. Media access circuitry 108 is also connected to memory controller 106, which may be embodied as any device or circuitry (e.g., a processor, a co-processor, dedicated circuitry, etc.) configured to selectively read from and/or write to the memory media 110 in response to corresponding requests (e.g., from the processor 102 which may be executing an artificial intelligence related application that relies on stochastic associative searches to recognize objects, make inferences, and/or perform related artificial intelligence operations). In some embodiments, memory controller 106 may include a vector function unit (VFU) 130, which may be embodied as any device or circuitry (e.g., dedicated circuitry, reconfigurable circuitry, an application specific integrated circuit (ASIC), a field programmable gate array (FPGA), etc.) capable of offloading vector-based tasks from processor 102 (e.g., comparing data read from specific columns of vectors stored in the memory media 110, determining Hamming distances between the vectors stored in the memory media 110 and a search key, sorting the vectors according to their Hamming distances, etc.).

Figure 2:
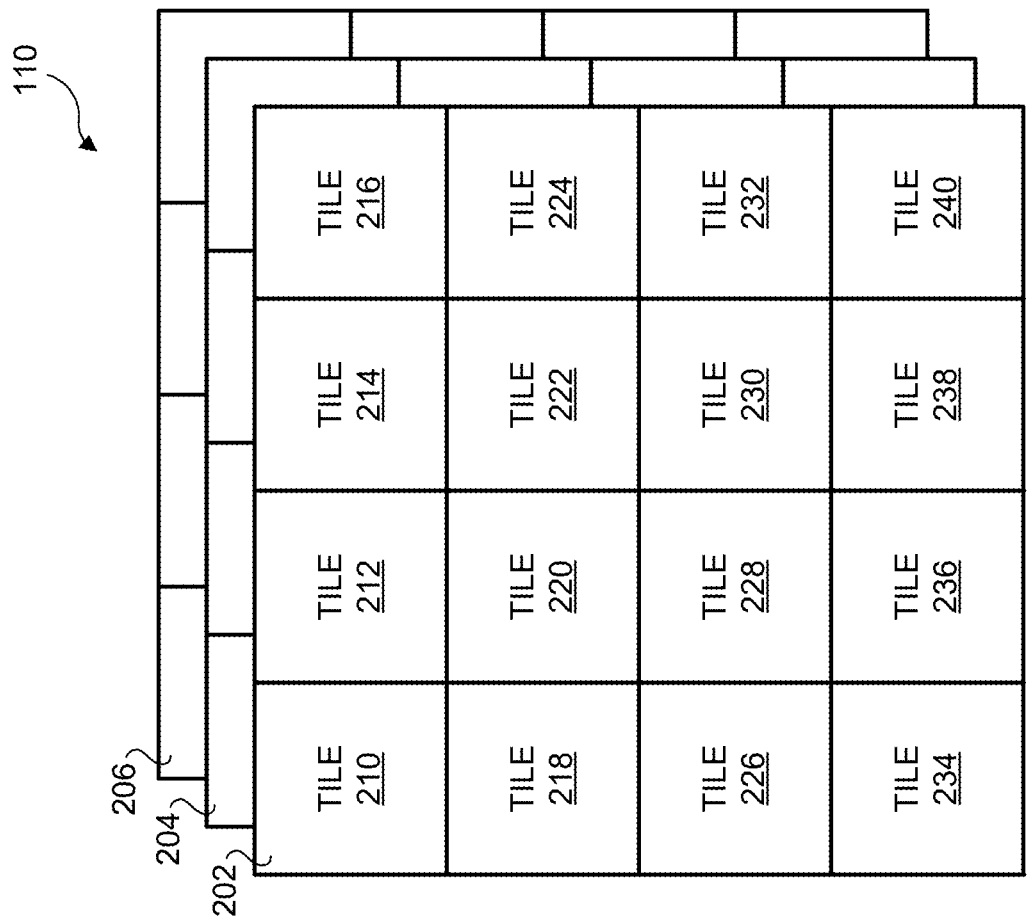
FIG. 2 is a simplified diagram of at least one embodiment of a memory media included in the compute device of FIG. 1.

As shown in FIG. 2, memory media 110 includes a tile architecture, also referred to herein as a cross-point architecture. Under the cross-point architecture, memory cells sit at the intersection of word lines and bit lines and are individually addressable, in which each memory cell (e.g., tile) 210, 212, 214, 216, 218, 220, 222, 224, 226, 228, 230, 232, 234, 236, 238, 240 is addressable by an x parameter and a y parameter (e.g., a column and a row). Memory media 110 includes multiple partitions, each of which includes the tile architecture. The partitions may be stacked as layers 202, 204, 206 to form a three-dimensional (3D) cross-point architecture, such as employed by but not limited to Intel® 3D XPoint™ memory. Unlike conventional memory devices, in which only fixed-size multiple-bit data structures (e.g., byte, words, etc.) are addressable, media access circuitry 108 is configured to read individual bits, or other units of data, from memory media 110 at the request of the memory controller 106, which may produce the request in response to receiving a corresponding request from the processor 102.

Returning to FIG. 1, memory 104 may include non-volatile memory and volatile memory. The non-volatile memory may be embodied as any type of data storage capable of storing data in a persistent manner, including when power is removed from the non-volatile memory). For example, the non-volatile memory may be embodied as one or more non-volatile memory devices. The non-volatile memory devices may include one or more memory devices configured in a cross-point architecture that enables bit-level addressability and are embodied as 3D cross-point memory. In some embodiments, the non-volatile memory may additionally include other types of memory, including any combination of memory devices that use chalcogenide phase change material (e.g., chalcogenide glass), ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM.

Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, JESD79-5 DDR5 SDRAM standard original published by JEDEC in July 2020), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org. The volatile memory may have an architecture that enables bit-level addressability, similar to the architecture described above.

Processor 102 and memory 104 are communicatively coupled to other components of the compute device 100 via I/O subsystem 112, which may be embodied as circuitry and/or components to facilitate I/O operations with processor 102, main memory 104 and other components of the compute device 100. For example, I/O subsystem 112 may be embodied as, or otherwise include, memory controller hubs, I/O control hubs, integrated sensor hubs, firmware devices, communication links (e.g., point-to-point links, bus links, wires, cables, light guides, printed circuit board traces, etc.), and/or other components and subsystems to facilitate the I/O operations. In some embodiments, I/O subsystem 112 may form a portion of a system-on-a-chip (SoC) and be incorporated, along with one or more of the processor 102, memory 104, and other components of the compute device 100, in a single chip.

Data storage device 114 may be embodied as any type of device configured for short-term or long-term storage of data such as, for example, memory devices and circuits, memory cards, hard disk drives, solid-state drives, or other data storage device. In the illustrative embodiment, data storage device 114 includes a memory controller 116, similar to the memory controller 106, memory media 120 (also referred to as "storage media"), similar to the memory media 110, and media access circuitry 118, similar to the media access circuitry 108. Further, memory controller 116 may also include a vector function unit (VFU) 132 similar to the vector function unit (VFU) 130. Data storage device 114 may include a system partition that stores data and firmware code for the data storage device 114 and one or more operating system partitions that store data files and executables for operating systems.

Communication circuitry 122 may be embodied as any communication circuit, device, or collection thereof, capable of enabling communications over a network between the compute device 100 and another device. Communication circuitry 122 may be configured to use any of one or more communication technology (e.g., wired or wireless communications) and associated protocols (e.g., Ethernet, USB, Bluetooth®, Wi-Fi®, WiMAX, etc.) to effect such communication.

The illustrative communication circuitry 122 includes a network interface controller (NIC) 124, which may also be referred to as a host fabric interface (HFI). NIC 124 may be embodied as one or more add-in-boards, daughter cards, network interface cards, controller chips, chipsets, or other devices that may be used by the compute device 100 to connect with another compute device via a network or fabric. In some embodiments, NIC 124 may be embodied as part of a system-on-a-chip (SoC) that includes one or more processors, or included on a multichip package that also contains one or more processors. In some embodiments, NIC 124 may include a local processor (not shown) and/or a local memory (not shown). In such embodiments, the local processor of NIC 124 may be capable of performing one or more of the functions of the processor 102. Additionally or alternatively, in such embodiments, the local memory of NIC 124 may be integrated into one or more components of the compute device 100 at the board level, socket level, chip level, and/or other levels.

The one or more accelerator devices 126 may be embodied as any device(s) or circuitry capable of performing operations in an accelerated manner that are offloaded from processor 102. For example, accelerator device(s) 126 may include a graphics processing unit (GPU) 128, which may be embodied as any device or circuitry (e.g., a co-processor, an ASIC, reconfigurable circuitry, etc.) capable of performing graphics operations (e.g., matrix operations). In some embodiments, a GPU may employ a programming language targeted to machine learning and AI operations, such as CUDA or a similar language that leverages the underlying processor elements and structures in the GPU.

Figure 3:
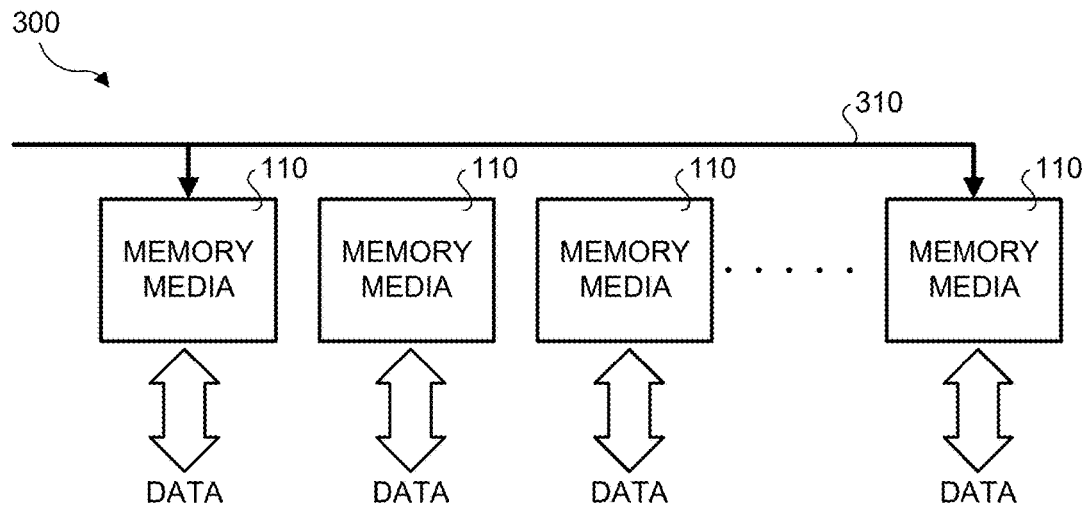
FIG. 3 is a simplified diagram of at least on embodiment of the memory media of the compute device of FIG. 1 in a Dual In-line Memory Module (DIMM)

Referring now to FIG. 3, compute device 100, in some embodiments, may utilize a dual in-line memory module (DIMM) architecture 300. In DIMM architecture 300, multiple dies of the memory media 110 are connected to a shared command address bus 310. As such, in operation, data is read out in parallel across all memory media 110 connected to shared command address bus 310. Data may be laid out across memory media 110 in a configuration to allow reading the same column across multiple connected dies of memory media 110.

Figure 4:
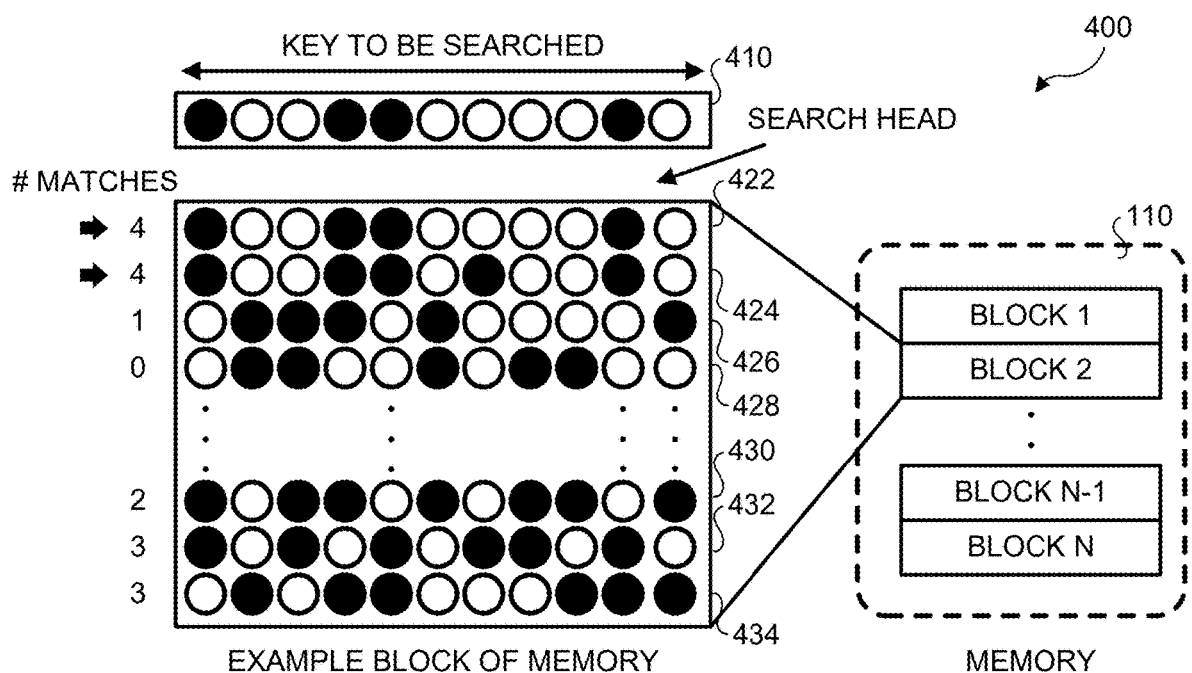
FIG. 4 is a simplified diagram of a stochastic associative search (SAS) performed using a binary search key on the memory media of FIGS. 1-3.

As illustrated in FIG. 4, compute device 100 may perform a stochastic associative search 400, which is a highly efficient and fast way of searching through a large database of records and finding similar records to a given query record (key). For simplicity and clarity, the stochastic associative search 400 and other processes are described herein as being performed with memory 104. However, it should be understood that the processes could alternatively or additionally be performed with storage device 114, depending on the particular embodiment. Given that memory media 110 allows both row- and column-wise reads with similar read latency, memory media 110 is particularly suited to enabling efficient stochastic associative searches. As described in further detail below, to utilize the characteristics of the memory media 110 to perform efficient stochastic associative searches, compute device 100 writes database elements (e.g., records, vectors, rows, etc.) to memory media 110 in binary format (e.g., ones and zeros) as sparse (e.g., have more zeros than ones or more ones that zeros) bit vectors. (Bit vectors are also called bit arrays in the computer arts.)

In some embodiments, the sparse bit vectors comprise hash codes (e.g., sequences of values produced by a hashing function), although any form of sparse bit vector may be used. Subsequently, in performing a search, individual binary values (bits) of search key 410 are compared to the corresponding binary values in the database elements (e.g., bit vectors) 422, 424, 426, 428, 430, 432, 434 stored in the blocks of memory media 110. Compute device 100 determines the number of matching set bits between the search key 410 and each database element (e.g., vector), which is representative of a Hamming distance between the search key 410 and each database element (e.g., vector). The database elements (e.g., vectors) having the greatest number of matches (e.g., lowest Hamming distance) are the most similar results (e.g., the result set) for the stochastic associative search 400. Compute device 100 may also produce a refined result set by mapping a portion of the result set (e.g., the 100 top results) and the search key to another space (e.g., floating point space), and finding a smaller set (e.g., the top ten) of the results that have the closest Euclidean distance from the search key.

Example flows of operations may proceed as follows depending on the particular embodiment (e.g., whether the vector function unit 130 is present). The elements are stored in the memory media 110 as bit vectors using row write operations. For a given stochastic associative search, the compute device 100 formats a search query using a hash encoding that matches the hash encoding used to produce the binary format of the bit vectors in the database. In at least some embodiments in which VFU 130 is not present, processor 102 sends a block column read request to the memory controller 106 to read specified columns (e.g., the columns corresponding to the set bits (bits having a value of '1') in search key 410). Processor 102 subsequently ranks all or a top portion M of matching rows (bit vectors) based on the number of set bits matching for the column data that was read. Prior to providing the results to the application, processor 102 may perform refinement of the search results.

In at least some embodiments in which VFU 130 is present, the process proceeds as follows. Processor 102 sends an instruction to memory controller 106 to perform a macro operation (e.g., return top M results based on a given search key 410). Subsequently, memory controller 106 sends a block column read request to the media access circuitry 108 to read, from the memory media 110, the columns corresponding to the set bits in the search key 410. VFU 130 in memory controller 106 subsequently ranks and sorts the top M matching rows (e.g., vectors) based on the number of set bits matching the column data that was read, and memory controller 106 subsequently sends, data indicative of the top M matching rows (e.g., vectors) as the search results to processor 102. Processor 102 may subsequently perform refinement of the search results. In some embodiments, the VFU 130 may perform at least a portion of the refinement of the search results.

Sparse m-of-n Constant Weight Codes

In order to fully utilize the column-read feature with sparse encodings that minimize the data reads, a class of codes called m-of-n constant weight codes are used. These codes have a constant weight (i.e., number of set bits in a codeword). A coupled of examples are provide below; however, in practice, any constant weight code may be used to suite the application needs.

Integer Encoding

For encoding of integers using sparse m-of-n constant weight codes, the integer is first converted into its hex representation, and each of the hex values is then encoded using the m-of-n code. FIGS. 5*a* and 5*b* show two possible options of m-of-n codes for hex characters. It is noted that while the m-of-n codes herein use '1's for m, the values for '1's and '0's could be swapped, where m would be '0's.

In FIG. 5*a*, a 2-of-7 constant weight encoding is used. In this instance, each of hex representations 0, 1, 2, . . . . E, F (integer 0-15) is encoded using 2 set bit values (value='1') with the remaining 5 bit values of the 7 total bit values being cleared (value='0'). In FIG. 5*b*, a 3-of-7 constant weight encoding is used, wherein each of hex representations 0, 1, 2, . . . . E, F (integer 0-15) is encoded with 3 set bits and 4 cleared bits.

Figure 6:
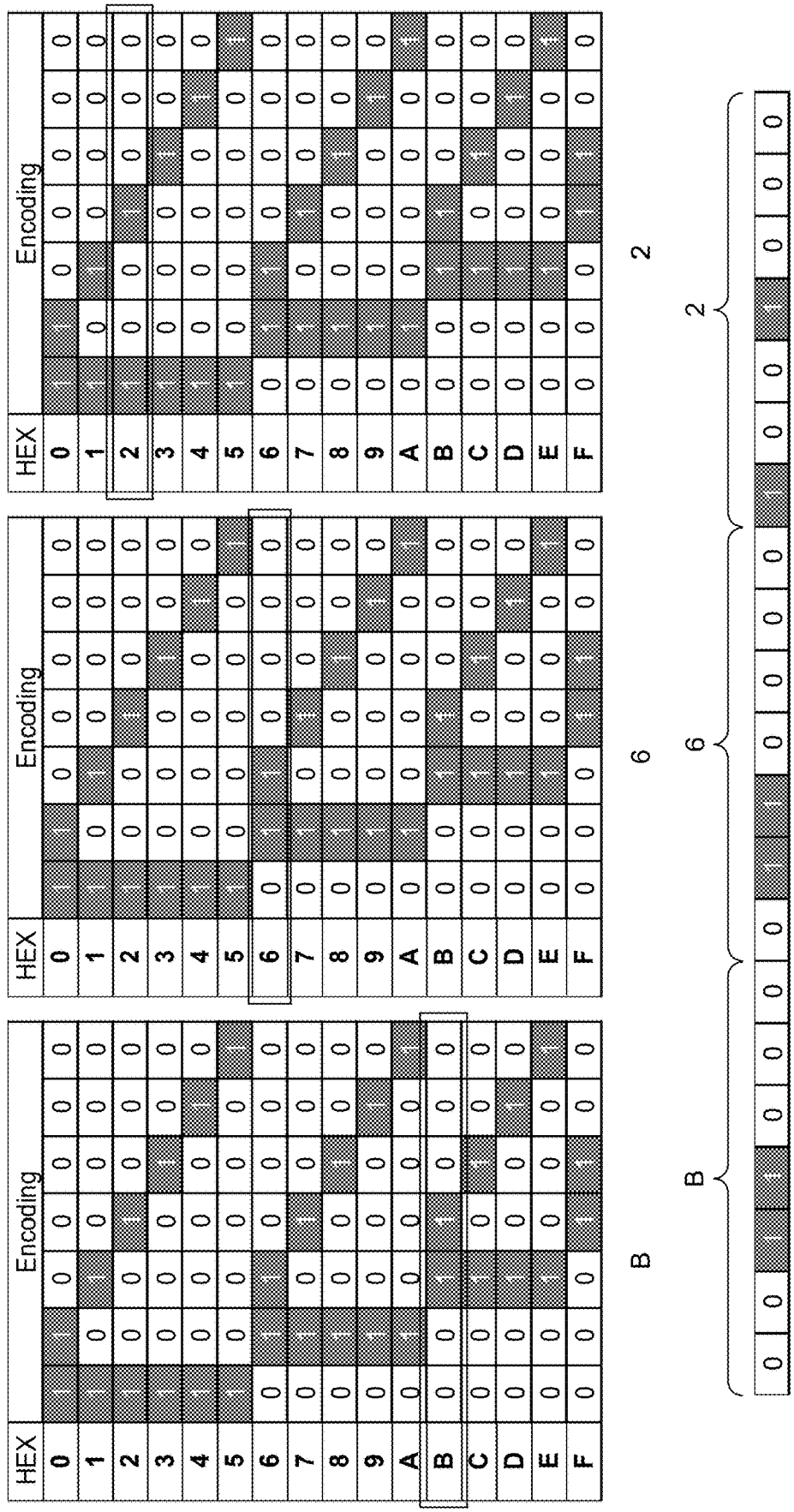
FIG. 6 shows an example of 2-of-7 constant weight encoding applied to the integer 2914.

The foregoing integer encoding scheme may be extended to integers of substantially any length. For example, FIG. 6 shows an example of how an integer value of 2914 is encoded using the 2-of-7 constant weight encoding scheme of FIG. 5*a*. The hex encoding of 2914=B62 hex. Thus, the bit encoding for hex B plus the bit encoding for hex 6 plus the bit encoding for 2 hex would be concatenated.

Float Encoding

For floating point data, the exponent and mantissa are encoded in the same way as integers, by converting the exponent into 2 hex characters for FP32 (32-bit floating-point format), and 3 hex characters for FP64 (64-bit floating point format). Similarly, we can convert the mantissa as well (6 hex characters for FP32 and 13 hex characters for FP64). The encoding hex characters using m-of-n codes is the same manner is described and show above.

FIG. 7 shows a floating point encoding of Planck's constant, which is:

$6.63_{10} \times 10^{-34}$.

As shown, the mantissa is 6.63 (base 10) and the exponent is 10-34. For base 10 floating point numbers the mantissa comprises a first integer 663 that is encoded into a first hexadecimal, and the mantissa comprises a second integer that is encoded into a second hexadecimal (−36, to account for the shift of two places when converting 6.63 to 663).

FIG. 8 shows show the format for FP32 and FP64, with an illustration of the exponent of FP32 using the 2-of-7 encoding of FIG. 5*a*. As with the example of FIG. 6, for the FP32 format, the exponent will comprise the 2-of-7 bit encoding for the 2 hex values concatenated together. Similarly, for the FP32 format, the mantissa will comprise a concatenation of the 2-of-7 bit encoding for the 6 hex values. As shown, for FP64 13 hex values (52-bits) are used for the mantissa and 3 hex values (12-bits) are used for the exponent.

It is noted that different floating-point formats known in the art may split the mantissa and exponent portions differently. However, the mantissa/exponent splits here are split along hex boundaries to leverage the m-to-n constant weight encoding scheme.

In one embodiment, an enhancement to this scheme encodes the sign bit and some number of most significant bits of the mantissa with a repetitive code at the cost of more space, providing better robustness to errors.

Utilizing Column Read

Figure 9:
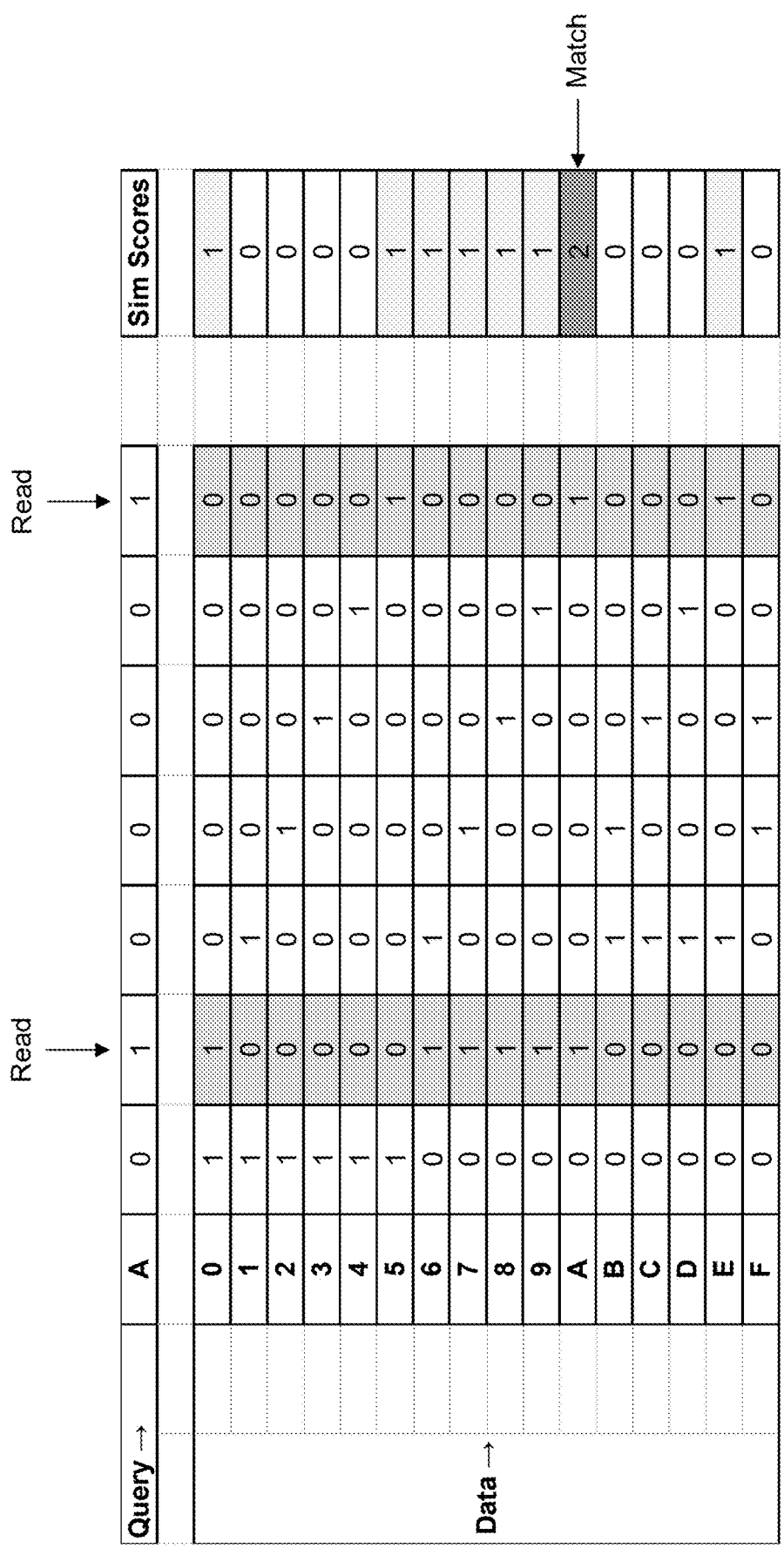
FIG. 9 is a diagram illustrating an example of calculating similarity scores using 2-of-7 constant weight encoding.

Under the embodiments disclosed herein, the column read capability of the memory is leveraged to enable very efficient scanning of a database or dataset stored in the memory by reading only the columns corresponding to the set bits. FIG. 9 shows an example of character matching by reading only the columns with set bits in the query character and adding them. The resulting similarity scores are inverse of hamming distance and can be used to find the match quickly.

In the example of FIG. 9, the query is for a hex value of 'A', which is encoded as 0100001. Rather than reading all the data from memory using row (or cacheline) Reads (the conventional approach), columns Reads are performed for only the set bit columns (i.e., columns encoded with a '1') for the encoded query value. The similarity scores (Sim Scores) at the right are a summation of the matching values from the two columns that are read. Since only 2 out of 7 bits are read for each encoded character, the bandwidth requirements are substantially reduced.

Figure 10A:
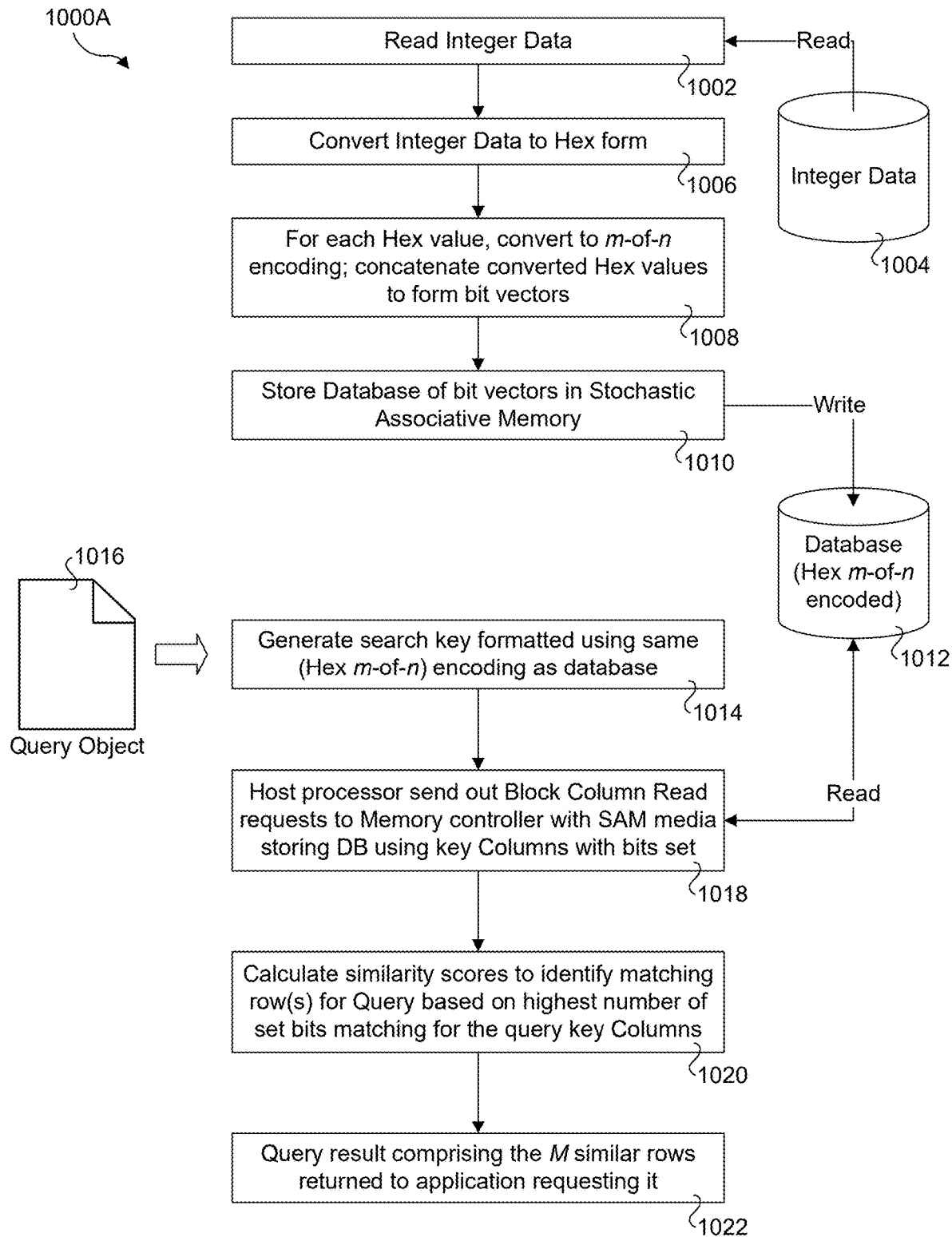
FIG. 10A is a flowchart illustrating an overview of operations performed by embodiments of memory controllers to generate a database of encoded integer data following by searching of the encoded integer data to detect matches.

FIG. 10A shows a flowchart 1000A illustrating an overview of operations performed by embodiments of memory controllers to generate a database of encoded integer data following by searching of the encoded integer data to detect matches. The first phase is writing the integer data to a database encoded using a hex m-of-n encoding. In a block 1002, integer data is read from a database 1004 (or other data source) and converted into a hexadecimal form in a block 1006. As shown in a block 1008, for each Hex value, the Hex value is converted to a corresponding m-of-n encoding, such as but not limited to the 2-of-7 Hex encoding shown FIG. 5A and the 3-of-7 Hex encoding shown in in FIG. 5B and discussed above. The converted Hex values are then concatenated to form bit vectors comprising k set bits. In a block 1010 the bit vectors are stored in database 1012, which is implemented using Stochastic Associative Memory (e.g., memory media 110 or 120), in one embodiment. Generally, the operations in blocks 1002, 1006, 1008 and 1010 may be performed in advance or on an ongoing basis (where additional bit vectors are added to database 1012).

The remaining operations in blocks 1014, 1018, 1020, and 1022 illustrate an overview of operations performed by embodiments of memory controllers that do not include a VFU when preforming integer searches of database 1012. This begins in block 1014, in which a search key is generated for an input query object 1016 submitted by an application using the same encoding as used in database 1012. For example, if query object 1016 is an integer, a Hex m-to-n encoding scheme described above may be used for generating the search key.

In block 1018 the host processor sends out block column read requests to the memory controller for the SAM media used for storing database 1012 using search key columns having their bits set (i.e., columns with '1's). In block 1020 the host processor calculates similarity scores to identify any matching rows for the query based on the highest number of set bits matching for the query key columns. In a block 1022 the query result comprising M (0 or greater) similar rows are returned to the application requesting it.

Figure 10B:
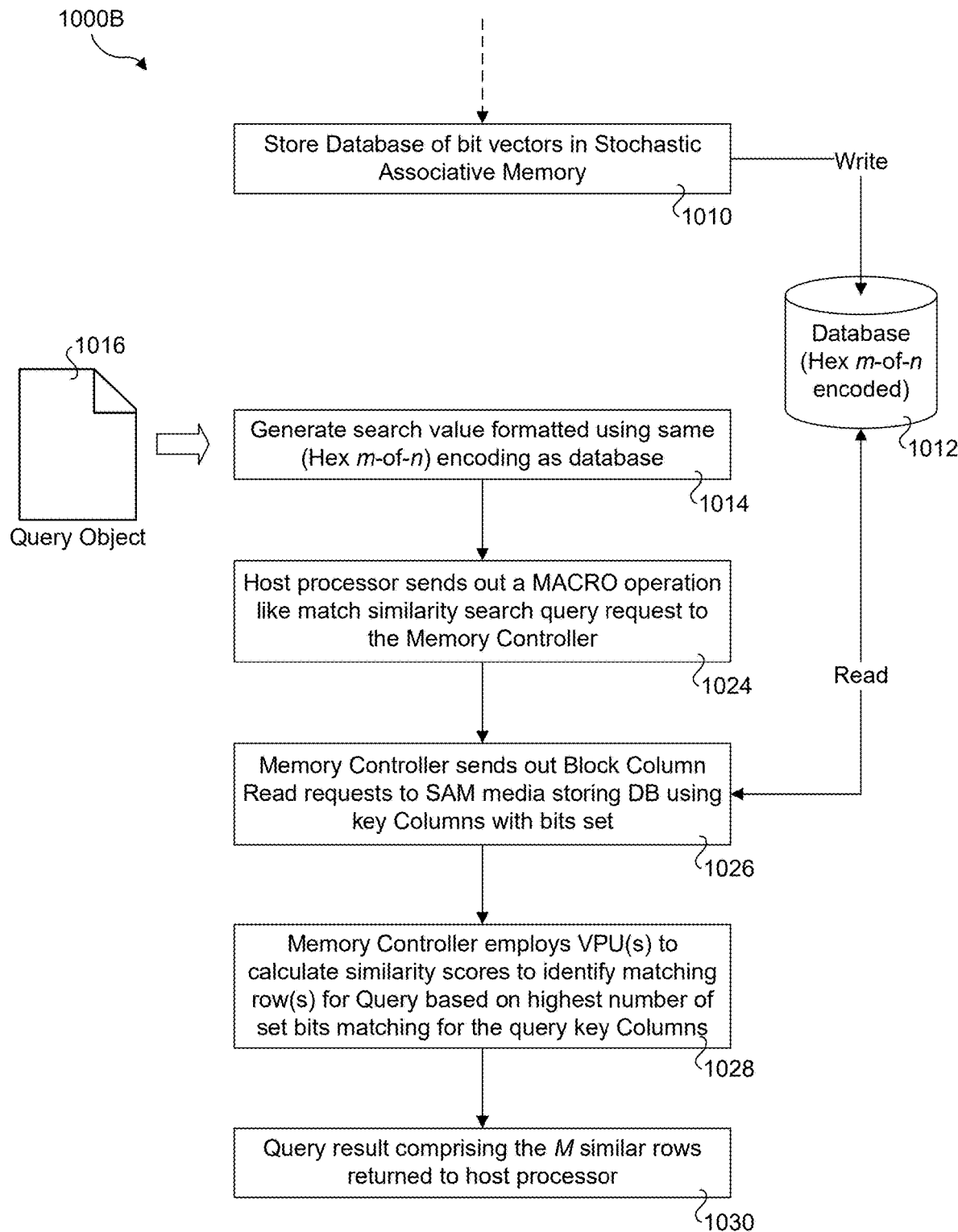
FIG. 10B is a flowchart illustrating operations performed by a memory controller including one of more VFUs when performing a match query, according to one embodiment.

FIG. 10B shows a flowchart 1000B illustrating operations performed by a memory controller including one of more VFUs when performing a match query, according to one embodiment. As indicated by like reference numbers, the operations in blocks 1010 and 1014, query object 1016, and database 1012 are the same for both flowchart 1000A and 1000B. In a block 1024, the host processor sends out a MACRO operation like a match similar search query request to the memory controller. In a block 1026 the memory controller sends out block column read requests to the SAM media used for storing database 1012 using the search key columns having their bits set. The memory controller employs its one or more VFUs calculate similarity scores to identify matching row(s) for the query based on the highest number of set bits matching for the query key columns, as shown in a block 1028. The query result comprising the M similar rows are then returned to the host processor in a block 1030.

Figure 11:
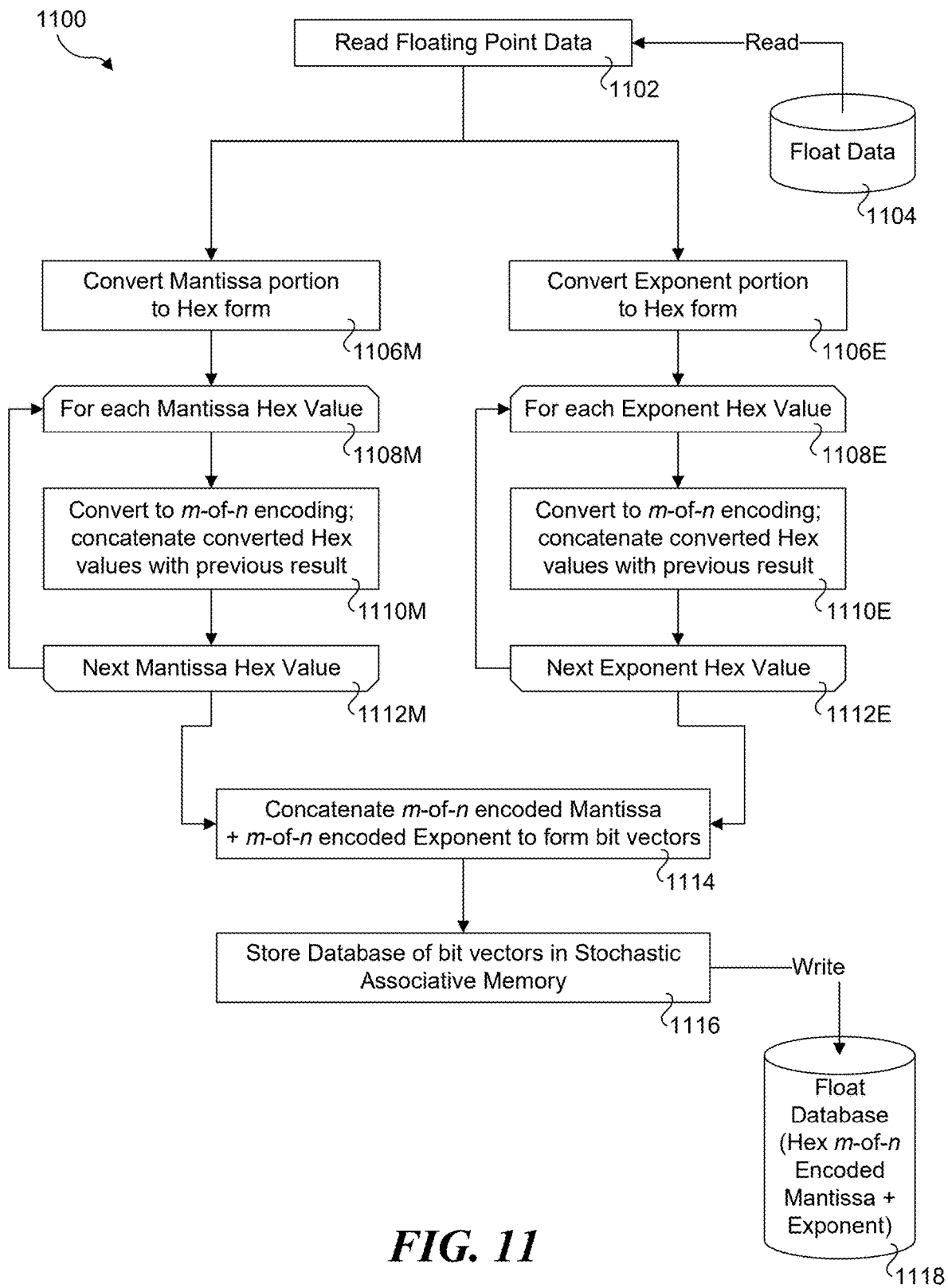
FIG. 11 is a flowchart illustrating operations for converting floating point data into encoded bit vectors and writing the bit vectors to a database in SAM media.

FIG. 11 shows a flowchart 1100 illustrating operations for converting floating point data into encoded bit vectors and writing the bit vectors to a database in SAM media. The process begins in a block 1102 where floating point data are read from a database, datastore, or other data storage means 1104. In this example, the processing of the Mantissa and Exponent are handled in parallel, where the operations on the left-hand side are performed for the Mantissa and the operations for the right-hand side are performed for the Exponent.

In a block 1106M the Mantissa is converted into Hex form. As shown by start and end loop blocks 1108M and 1112M and block 1110M, each Mantissa Hex value is converted to an m-of-n encoding and concatenated with previously converted Mantissa Hex values. While this process is shown using a loop, the conversion from Hex form of the Mantissa to m-of-n encoding may be performed in parallel. The net result is a bit string corresponding to the encoded Mantissa portion of the floating-point data.

In a block 1106E the Exponent is converted into Hex form. As shown by start and end loop blocks 1108E and 1112E and block 1110E, each Exponent Hex value is converted to an m-of-n encoding and concatenated with previously converted Exponent Hex values. Again, while this process is shown using a loop, the conversion from Hex form of the Exponent to m-of-n encoding may be performed in parallel. This similarly results in a bit string corresponding to the encoded Exponent portion of the floating-point data.

In a block 1114 the m-of-n encoded Mantissa and the m-of-n encoded Exponent are concatenated to form bit vectors. In one embodiment, the Mantissa is first, followed by the Exponent. In another embodiment, the Exponent is first, followed by the Mantissa. In a block 1116 the bit vectors are written to a database 1118 that is implemented in SAM media.

Figure 12A:
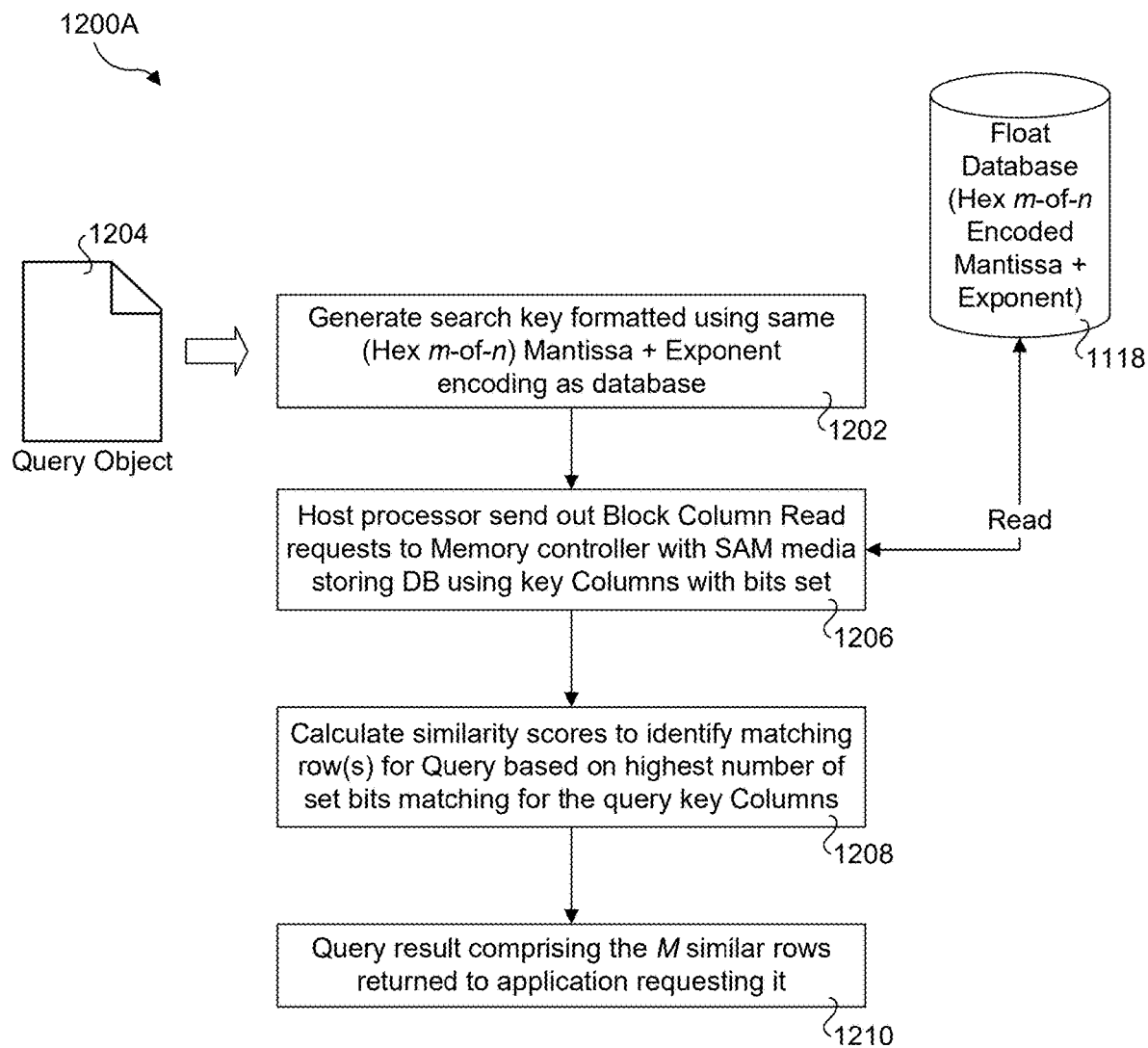
FIG. 12A is a flowchart illustrating operations performed by a memory controller without a VFU when performing a floating-point match query, according to one embodiment.

FIG. 12A shows a flowchart 1200A illustrating operations performed by a memory controller without a VFU when performing a floating-point match query, according to one embodiment. Since the encoding scheme for integers and floating-point data is similar, the query operations are similar to those shown in the lower portion of FIG. 10A. This process begins in block 1202, in which a search key is generated for an input query object 1204 comprising a float-point number submitted by an application using the same encoding as used in database 1118. For example, operations similar to those shown in FIG. 11 and discussed above may be used to generate the search key.

In block 1206 the host processor sends out block column read requests to the memory controller for the SAM media used for storing database 1118 using search key columns having their bits set (i.e., columns with '1's). In block 1208 the host processor calculates similarity scores to identify any matching rows for the query based on the highest number of set bits matching for the query key columns. In a block 1208 the query result comprising M (0 or greater) similar rows are returned to the application requesting it.

Figure 12B:
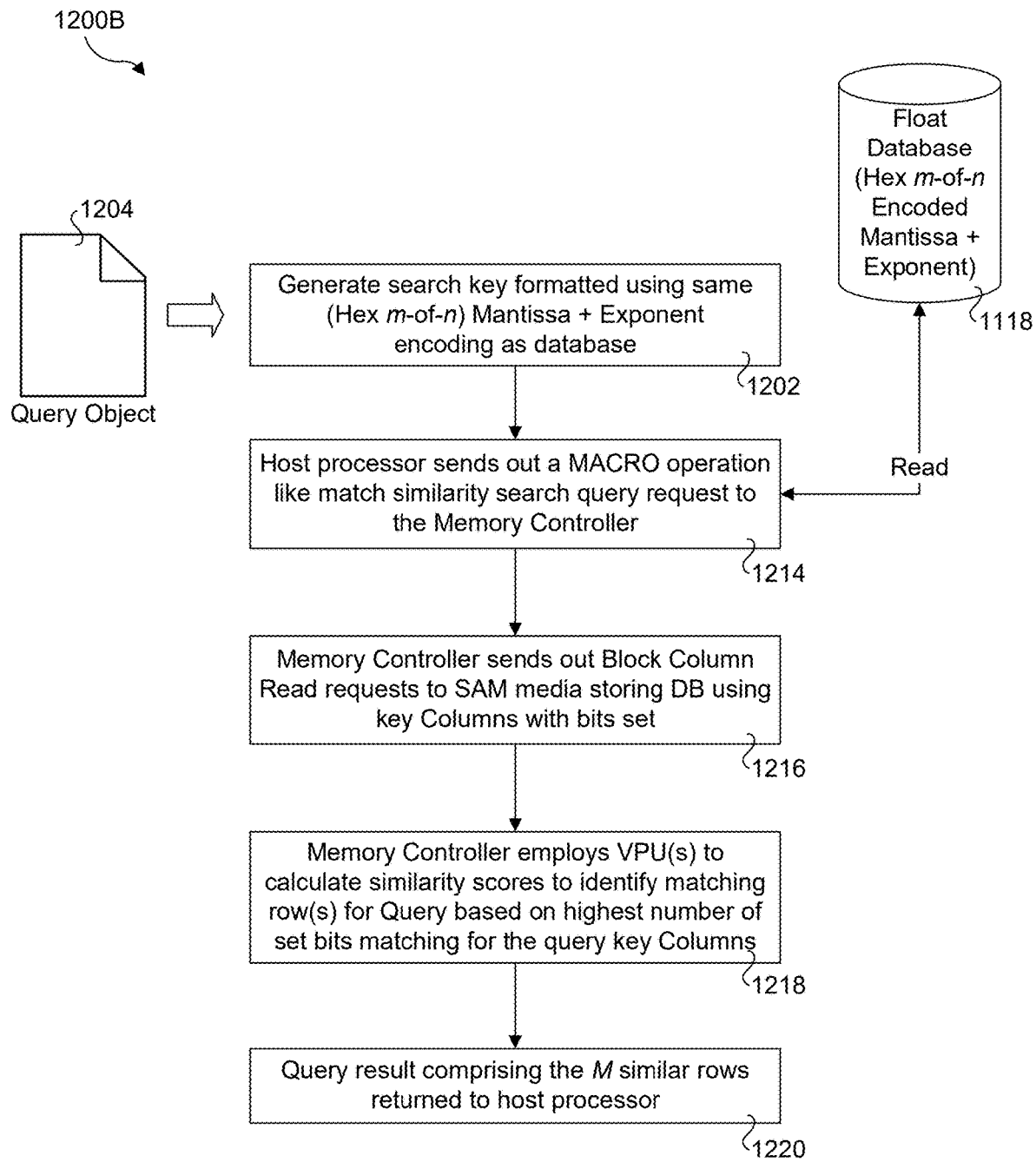
FIG. 12B is a flowchart illustrating operations performed by a memory controller including one of more VFUs when performing a floating-point match query, according to one embodiment.

FIG. 12B shows a flowchart 1200B illustrating operations performed by a memory controller including one of more VFUs when performing a floating-point match query, according to one embodiment. As indicated by like reference numbers, database 1118, block 1202 and query object 1204, are the same for both flowchart 1200A and 1200B. In a block 1214, the host processor sends out a MACRO operation like a match similar search query request to the memory controller. In a block 1216 the memory controller sends out block column read requests to the SAM media used for storing database 1118 using the search key columns having their bits set. The memory controller employs its one or more VFUs calculate similarity scores to identify matching row(s) for the query based on the highest number of set bits matching for the query key columns, as shown in a block 1218. The query result comprising the M similar rows are then returned to the host processor in a block 1220.

Integer Search Example

Figure 13:
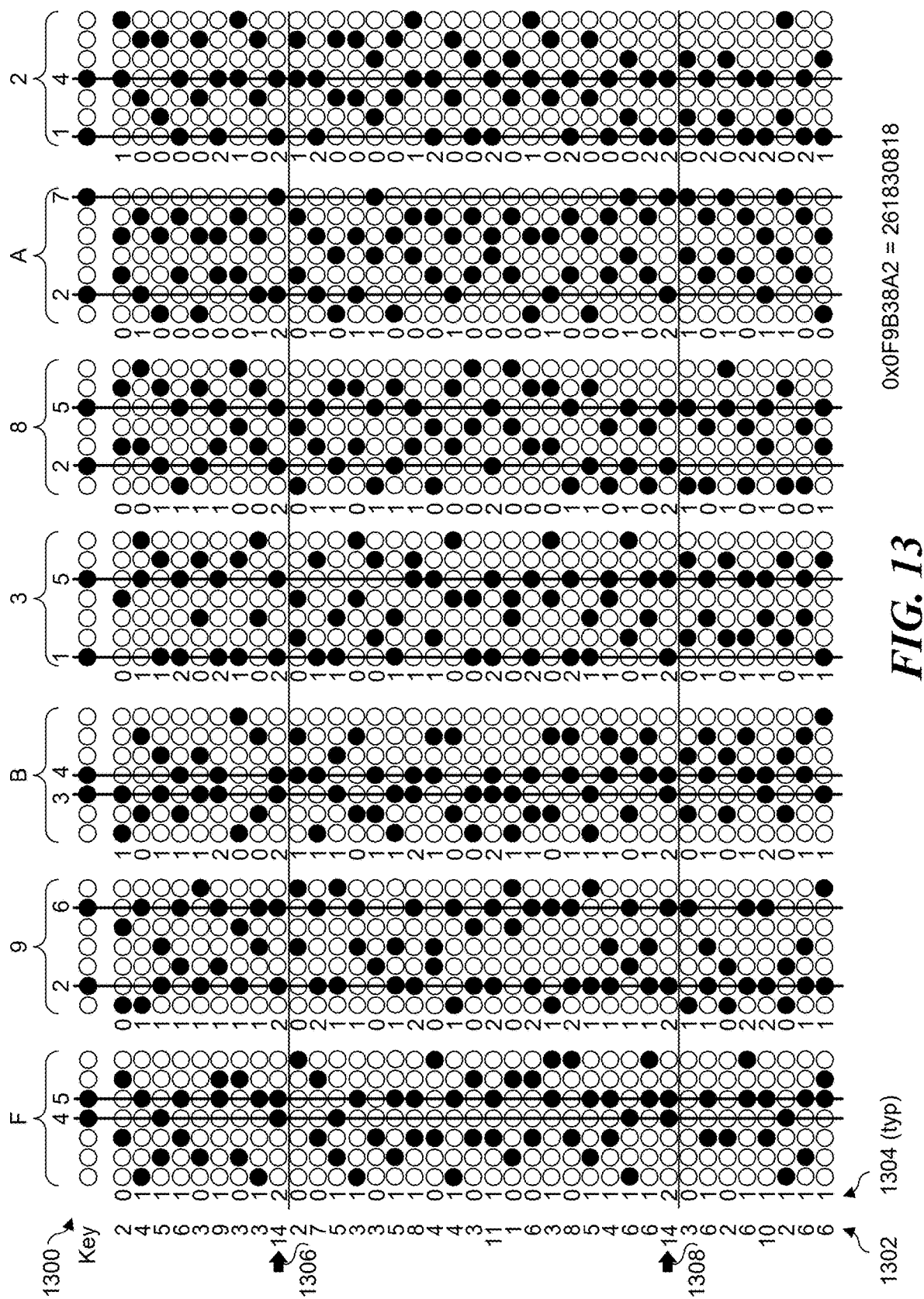
FIG. 13 is a diagram illustrating an example of an integer search for 261830818.

An illustrative example of an integer search for 261830818 is shown in FIG. 13. The Hex form for 261830818 is 0x0F9B38A2. For illustrative purposes, the columns in the portion of the database shown in FIG. 13 are logically grouped by encoded Hex values 'F' '9' 'B' '3' '8' 'A' and '2' (due to drawing size restrictions, only seven columns are shown rather than eight columns for a 32-bit integer, with the Hex group for '0' missing.) In FIG. 13, each circle represents a memory cell in the SAM media and the memory cells that are filled (black) represent set bits (value is '1'), while the memory cells that are not filled) represent cleared bits (value of '0'). A search key 1300 is generated using the Hex+m-of-n encoding scheme—in this case using the 2-of-7 encoding scheme of FIG. 5A. The resulting binary key is 0001100 0100010 0011000 1000100 0100100 0100001 1001000.

As described above, for an integer search only the columns having set bits set in search key 1300 are read. The matching bit are then added to obtain the similarity scores, as depicted by total scores 1302 and scores 1304 for each of the grouped encoded Hex values 'F' '9' 'B' '3' '8' 'A' and '2'. As shown in FIG. 13A, there are two matching rows 1306 and 1308, each with a total of 14 (corresponding to a match for each of the 7 encoded Hex groupings). An identifier for each of the matching rows is returned to the requesting application and/or host processor.

Floating-Point Search Example

Figure 14:
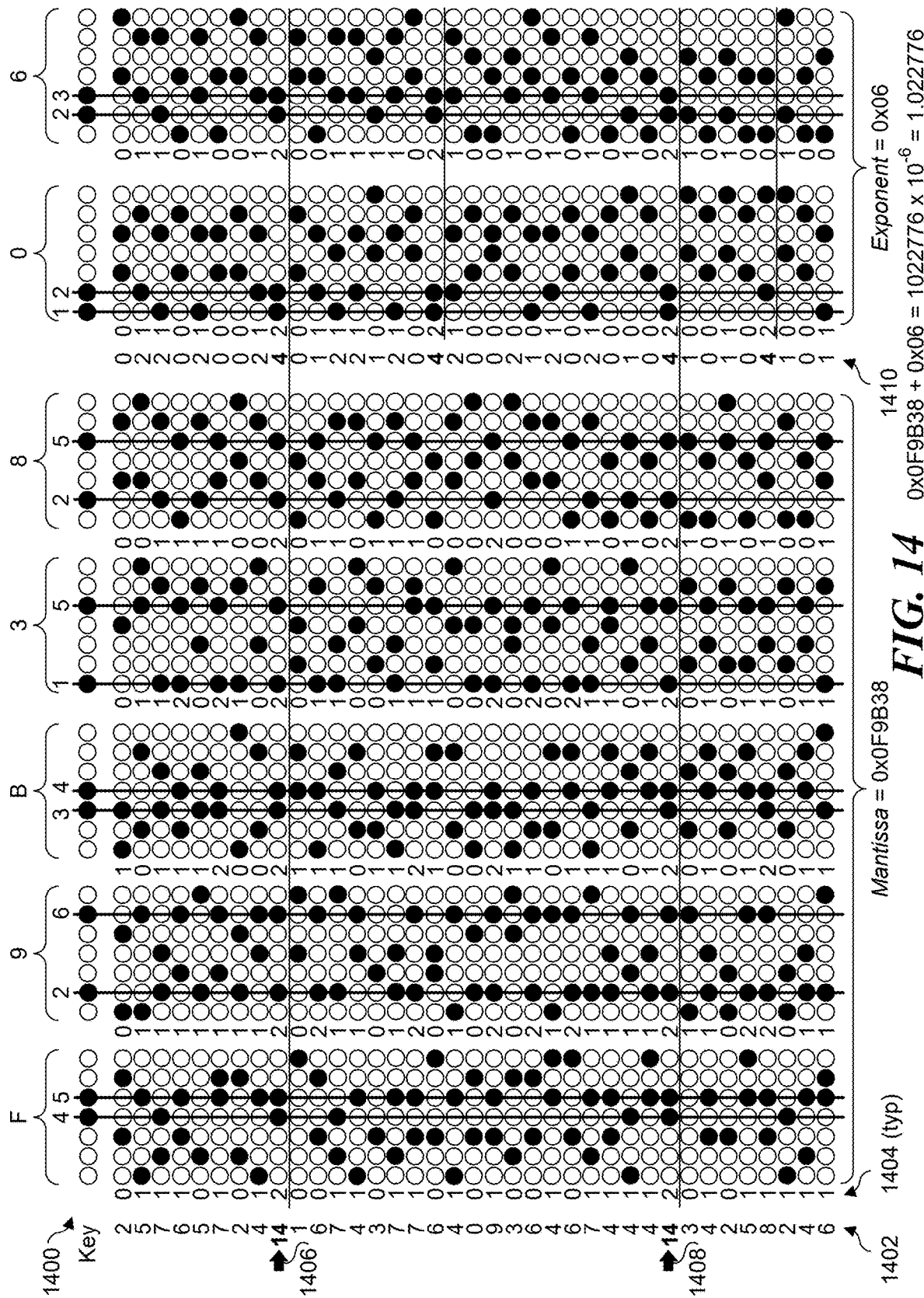
FIG. 14 is a diagram illustrating an example of a floating-point search for 1.022776.

An illustrative example of a 32-bit floating-point data (FP32) search for 1.022776 is shown in FIG. 14. As describe above, floating-point data are encoded as a Mantissa+Exponent. For FP32, the Mantissa is 24-bits (6 Hex values), and the Exponent is 2 Hex values. The Hex value for the Mantissa is 0x0F9B38. The Hex value for the Exponent is 0x06. (As above, due to drawing size restrictions, only seven columns are shown rather than eight columns for a 32-bit integer, with the Hex group for '0' missing.) In this example, the Exponent 06 is presumed to represent a negative exponent (since −6 using signed 2's compliment would require 4 Hex values-FFFA). A search key 1400 is generated using the Hex+m-of-n encoding scheme—in this case using the 2-of-7 encoding scheme of FIG. 5A. The resulting key is 0001100 0100010 0011000 1000100 0100100 1100000 0110000.

As with integer searches, for floating-point data searches only the columns having set bits set in search key 1400 are read. The matching bit are then added to obtain the similarity scores, as depicted by total scores 1402 and scores 1404 for each of the grouped encoded Hex values 'F' '9' 'B' '3' '8' '0' and '6'. As shown in FIG. 14, there are two matching rows 1406 and 1408, each with a total of 14 (corresponding to a match for each of the 7 encoded Hex groupings). In one embodiment, an identifier for each of the matching rows is returned to the requesting application and/or host processor.

In some cases (depending on the size of the queried database and characteristics of the float data), the query may be divided into two phases, where the exponent query is performed first and operates as a filter. For example, this approach may be advantageous when the float data to be searched (e.g., the float data in the database) has a less-common exponent. By using the exponent query first (and identifying all potential candidates with a matching exponent), the number of candidates that are used to match the mantissa can be substantially reduced.

An example of this two-phase approach is shown in FIG. 14, wherein total similarity scores 1410 for just the exponent portion are shown. For a 2-Hex exponent using 2-of-7 encoding the matches will have a similarity score total of 4, as shown by the underlined rows. Since this is a small number, all 4 rows could be returned and checked for a match of the mantissa during the second phase of the search. Statistical data may be kept and used to forecast the hit rate for different exponent values. A threshold could be used (e.g., based on forecast or actual hit rate) to determine whether to read all set bits (for both the mantissa and exponent) or use the two-phase approach.

Range Queries for Integers

Under a "range" query, all the entries that have an integer value within the specified range, e.g., [L(ow), H(igh)], are returned. The returned value could be a vector of 0s and 1s, where 1 means yes (in the range) and 0 means out of range.

The main idea is to break down the query of [L, H] into multiple small steps, and then perform "+" or "−" on the returned result (set of entries), where + means combining two sets, and − means deducting (subtracting) one from the other.

Let's start with a conceptual example,
Query_[6, 255]={all entries between 6 to 255}
={all entries≤255}−{all entries≤5}
={all entries≤255}−{all entries≤3}−{all entries==4}−{all entries==5}

Solution:
1. {all entries≤255} can be performed by a single data query of "000 . . . 00xxxxxxxx", the last 8 digits are don't care.
2. {all entries≤3} is similar as above, single query of "000 . . . 0000xx"
3. {all entries==4} this is a single data query
4. {all entries==5} this is also a single data query
5. Deduct the results of step 2, 3 and 4 from result 1.

Under the foregoing solution, one range query of [6, 255] is divided into four data queries with some vector operations. This is much faster than pulling out all the entries and performing a conversion and comparison. It is also faster than performing 250 individual data queries, e.g., a query for each single data value from 6 to 255.

It is noted the data query here is different than described above when searching for a single (match) value under which only the set data are compared. Under the following Full_Data_Query (FDQ) approach, both 0 and 1 are compared.

In the above example, it is assumed every binary bit can be separated and is directly readable. However, integers are stored by Hex number, which means 4 binary bits are encoded together. As a result, a further mechanism is used to distinguish any sub-range from 0 to any one from 1 to 15.

In the following description, the 2-in-7 encoding shown in FIG. 5A is used as an example. There are three ranges having the following patterns where 'x'=don't care:
[0, 5]=FDQ("1xxxxxx")
[0, A]=FDQ("1xxxxxx")+FDQ("01xxxxx")
[0, E]=FDQ("1xxxxxx")+FDQ("01xxxxx")+FDQ("001xxxx")

The rest of the entries can be built upon these three basic entries by adding or subtracting. For example
[0,1]=[0]+ [1]=FDQ("1100000")+FDQ("1010000")
[0,4]=[0,5]−[5]=FDQ("1xxxxxx")−FDQ("1000001")
[0,6]=[0,5]+ [6]=FDQ("1xxxxxx")+FDQ("0110000")

. . .

Now, let's look at a range query for Hex-based encoded integers.

Query for [0x12, 0xAB] (Integer range from 18 to 171)
=[0, 0xAB]−[0, 0x12]
=[0, 0x9F]+[0xA0, 0xAB]−[0, 0x0F]−[0x10, 0x12]
[0, 0x9F] searching for "0000 00(0-9)x", where (0-9) is sub-range for hex_bit_1
=FDQ("0000 00xx")∩FDQ("xxxx xx (0-9)x"
∩ is the logical intersection of two sets
[0xA0, 0xAB] searching for "0000 00A(0-B)"=
FDQ("0000 00Ax")∩FDQ("xxxx xxx (0-B)"
[0, 0x0F] searching for "0000 000x"
[0x10, 0x12] searching for "0000 001(0-2)"=
FDQ("0000 001x")∩FDQ("xxxx xxx (0-2)"

As before, one range query is divided into a few simple data queries with associated logic operations.

Range Queries for Floats

Range queries for floats are performed in a similar manner to range queries for integers, except that the exponent and mantissa are handled separately. One query may be divided into more minor steps. But the main idea is the same.

As before, in some cases (depending on the range in the query and characteristics of the float data), the query may be divided into two phases, where the exponent query is performed first and operates as a filter. For example, this approach may be advantageous when the float data to be searched (e.g., the float data in the database) have a wide range of values over multiple orders of magnitude. By using the exponent query first (and identifying all potential candidates within the range query), the number of candidates that are used to match the mantissa can be substantially reduced.

Robustness to Bit Errors

Column reads provide a unique feature that not all the bits are read during a simple data query. A 0-to-1 flip won't affect the original data itself. It may add a false hit to some other values, but not for all data values. This will add some extra work for further pruning but is not a critical problem.

A 1-to-0 flip will become a false miss. This can be solved by two enhancements:

1) Adding the bit-weight for encoding and lowering the threshold for sum. For example, encoding with weight 4 and the sum of 3 or above is a hit.
2) Repetitive code-repeat the same encoding multiple times and trading off more storage space for robustness.

The encoding schemes disclosed herein provide several advantages. First, any arbitrary data type (integer, float, double etc.) can be encoded using this approach. Second, only a small fraction of the data needs to be read to perform filtering, using the column read feature of the memory media. Third, the encoding is robust to errors, and compatible with non-ECC protected column reads, which enable vastly simpler controller implementations. In addition, a repetitive coding scheme is proposed where the code is made more sparse and enables more robustness to errors, particularly in those encoding schemes where most significant bits are more important than least significant bits, such as floating point numbers.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'k', 'm', 'n', 'M', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus, comprising:
   row and column addressable memory media having plurality of rows and columns of memory cells configured to be populated with binary data comprising a plurality of bit vectors; circuitry connected to the memory media, wherein the circuitry is to:
      receive a query from a requesting entity for matching an integer or floating-point number;
      convert the integer or floating-point number to generate a search key having an encoded format comprising a bit vector having a predetermined number k set bits;
      perform column-wise reads of the memory media on only k columns of the plurality of columns, each of the k columns associated with a respective one of the k set bits, to obtain a plurality of vertical bit vectors;
      aggregate set bits in the plurality of vertical bit vectors on a row-wise basis;
      based on the aggregation, calculate similarity scores for a plurality of rows;
      determine, based on the similarity scores, rows, of the plurality rows, that store data matching the search key; and
      return the rows that store data matching the search key to the requesting entity.

2. The apparatus of claim 1, wherein the circuitry generates the encoded format by:
   converting the integer or floating-point number to a Hexadecimal (Hex) format;
   for each of a plurality of Hex values in the Hex format, encoding the Hex value using an m-of-n constant weight encoding to generate encoded Hex values; and
   concatenating the encoded Hex values to form a bit vector having k set bits.

3. The apparatus of claim 2, wherein the m-of-n constant weight encoding comprises 2-of-7 or 3-of-7 encoding.

4. The apparatus of claim 2, wherein the query is for a 32-bit floating point number comprising a mantissa portion and an exponent portion, and wherein the encoded Hex values comprise 6 encoded Hex values for the mantissa portion and 2 encoded Hex values for the exponent portion.

5. The apparatus of claim 2, wherein the query is for a 64-bit floating point number comprising a mantissa portion and an exponent portion, and wherein the encoded Hex values comprise 13 encoded Hex values for the mantissa portion and 3 encoded Hex values for the exponent portion.

6. The apparatus of claim 2, wherein the circuitry is configured to calculate a similarity score for a group of columns storing data corresponding to a single encoded Hex value.

7. The apparatus of claim 2, wherein k is an integer equal to m, of the m-of-n encoding, multiplied by a number of concatenated Hex values in the plurality of Hex values.

8. The apparatus of claim 1, wherein the circuitry connected to the memory media includes a vector function unit (VFU), and wherein the operations of aggregating set bits in the plurality of vertical bit vectors and calculating the similarity scores are performed by the VFU.

9. The apparatus of claim 1, wherein the memory media comprises stochastic associative memory (SAM) media.

10. The apparatus of claim 1, wherein the memory media comprises three-dimensional cross-point memory.

11. The apparatus of claim 1, wherein the apparatus comprises a data storage device.

12. The apparatus of claim 1, wherein to aggregate the set bits on the row-wise basis comprises grouping, into respective groups of no more than k bits, the set bits according to the row-wise basis.

13. A computing system comprising
   a processor;
   row and column addressable memory media having plurality of rows and columns of memory cells; and circuitry connected to the memory media and operatively connected to the processor, wherein the computing system is configured to:
- store data comprising a plurality of sparse binary bit vectors in respective rows in the memory media;
- receive a query from a requesting entity for matching an integer or floating-point number;
- convert the integer or floating-point number to generate a search key having an encoded format comprising a bit vector having a predetermined number k set bits;
- perform column-wise reads of the memory media on only k columns of the plurality of columns, each of the k columns associated with a respective one of the k set bits, to obtain a plurality of vertical bit vectors;
- aggregate set bits in the plurality of vertical bit vectors on a row-wise basis;
- based on the aggregation, calculate similarity scores for a plurality of rows;
- determine, based on the similarity scores, rows, of the plurality of rows, that store data matching the search key; and
- return the rows that store data matching the search key to the requesting entity.

14. The computing system of claim 13, wherein the search key is generated by:
- converting the integer or floating-point number to a Hexadecimal (Hex) format;
- for each of a plurality of Hex values in the Hex format, encoding the Hex value using an m-of-n constant weight encoding to generate encoded Hex values; and
- concatenating the encoded Hex values to form a bit vector having k set bits.

15. The computing system of claim 14, wherein the m-of-n constant weight encoding comprises one of 2-of-7 encoding and 3-of-7 encoding.

16. The computing system of claim 14, wherein the query is for one of a 32-bit floating point number composed of a 24-bit mantissa portion and an 8-bit exponent portion or a 64-bit floating point number composed of a 52-bit mantissa portion and a 12-bit exponent portion.

17. The computing system of claim 11, wherein the circuitry connected to the memory media includes a vector function unit (VFU), and the operations of aggregating set bits in the plurality of vertical bit vectors and calculating the similarity scores are performed by the VFU.

18. The computing system of claim 11, wherein the memory media comprises stochastic associative memory (SAM) media.

19. A method comprising:
- receiving a query from a requesting entity for matching an integer or floating-point number previously written to a memory media having a plurality of rows and columns of memory cells using an encoded version of the integer or floating-point number using an m-of-n constant weight encoding;
- converting the integer or floating-point number to a Hexadecimal (Hex) format;
- for each of a plurality of Hex values in the Hex format, encoding the Hex value using the m-of-n constant weight encoding to generate encoded Hex values;
- concatenating the encoded Hex values to form a search key comprising a bit vector having k set bits;
- performing column-wise reads of the memory media on only k columns of the plurality of columns, each of the k columns associated with a respective one of the k set bits, to obtain a plurality of vertical bit vectors, each vertical bit vector associated with a respective column and comprising a sequence of binary data having bit positions associated with respective rows;
- aggregating set bits in the plurality of vertical bit vectors on a row-wise basis;
- based on the aggregation, calculating similarity scores for a plurality of rows;
- determining, based on the similarity scores, rows, of the plurality of rows, that store data matching the search key; and
- returning the rows that store data matching the search key to the requesting entity.

20. The method of claim 19, further comprising:
for each integer or floating-point number, storing the encoded version of the integer or floating-point number by,
- converting the integer or floating-point number into the Hex format;
- for each of the plurality of Hex values in the Hex format, encoding the Hex value using the m-of-n constant weight encoding to generate the encoded Hex values;
- concatenating the encoded Hex values to form the bit vector;
- writing the bit vector to the memory media; and
- searching for bit vectors written to the memory media matching the search key comprising a bit vector having k set bits, wherein k is an integer equal to m, of the m-of-n encoding, multiplied by a number of Hex values of the plurality of Hex values.

21. The method of claim 20, wherein the m-of-n constant weight encoding comprises one of 2-of-7 encoding and 3-of-7 encoding.

22. The method of claim 20, wherein at least one floating point number comprises one of a 32-bit floating point number composed of a 24-bit mantissa portion and an 8-bit exponent portion or a 64-bit floating point number composed of a 52-bit mantissa portion and a 12-bit exponent portion.

* * * * *